US009692819B2

United States Patent
Rawat et al.

(10) Patent No.: US 9,692,819 B2
(45) Date of Patent: Jun. 27, 2017

(54) DETECT PROCESS HEALTH REMOTELY IN A REALTIME FASHION (71) Applicant: Oracle International Corporation, Redwood Shores, CA (US)

(72) Inventors: Rahul Rawat, Bangalore (IN); Jonathan D. Klein, Redwood City, CA (US); Jayakumar Sadras, Bangalore (IN); Sreekanth Vedavyas, Bangalore (IN); Sriram Kini, Sunnyvale, CA (US); Annesharmila Immanueljoseph, Bangalore (IN); Mark Ramacher, San Carlos, CA (US); Anurag Mathur, Bangalore (IN); Farouk Abushaban, Colorado Springs, CO (US)

(73) Assignee: Oracle International Corporation, Redwood Shores, CA (US)

( * ) Notice: Subject to any disclaimer, the term of this patent is extended or adjusted under 35 U.S.C. 154(b) by 144 days.

(21) Appl. No.: 14/685,062

(22) Filed: Apr. 13, 2015

(65) Prior Publication Data

US 2016/0092288 A1  Mar. 31, 2016

(30) Foreign Application Priority Data

Sep. 27, 2014  (IN) .......................... 4760/CHE/2014

(51) Int. Cl.
*G06F 11/00* (2006.01)
*H04L 29/08* (2006.01)
(Continued)

(52) U.S. Cl.
CPC ...... *H04L 67/1025* (2013.01); *G06F 11/0715* (2013.01); *G06F 11/0757* (2013.01);
(Continued)

(58) Field of Classification Search
CPC ............... H04L 67/1025; H04L 67/101; H04L 67/1034; H04L 67/1004; H04L 67/1006;
(Continued)

(56) References Cited

U.S. PATENT DOCUMENTS

9,454,444 B1 *  9/2016  Agarwal ............ G06F 11/1425
2003/0018930 A1 *  1/2003  Mora ..................... H04L 67/104
714/42
(Continued)

*Primary Examiner* — Michael Maskulinski
*Assistant Examiner* — Anthony J Amoroso
(74) *Attorney, Agent, or Firm* — Inoke (57) ABSTRACT

A system of remote nodes may be divided into sets of partner nodes. One remote node becomes a partner of another remote node. As partners, the nodes agree to monitor each other's health and report anomalies, such as a failure of one of the nodes, to a monitoring server. The nodes do so using a persistent communication link, such as an open socket. Using the described techniques, the monitoring load of a system is distributed in part away from the monitoring server and to the nodes themselves. This may reduce the resources required of the monitoring server. At the same time, since nodes are now being monitored by partner nodes that are likely to be closer than the monitoring server, and/or on account of the monitoring being performed via a persistent communication link, certain failures can be detected in real-time or near real-time.

28 Claims, 3 Drawing Sheets

(51) Int. Cl.
*G06F 11/07* (2006.01)
*G06F 11/30* (2006.01)
*H04L 29/14* (2006.01)

(52) U.S. Cl.
CPC ............ *G06F 11/30* (2013.01); *H04L 67/101* (2013.01); *H04L 67/1034* (2013.01); *H04L 69/40* (2013.01)

(58) Field of Classification Search
CPC ............... H04L 67/104; H04L 67/1042; H04L 67/1044; H04L 67/1046; H04L 67/1048; H04L 67/1053; H04L 67/1059; H04L 67/1061; H04L 67/1063; H04L 67/1065; H04L 67/1068; H04L 67/107; H04L 67/1072; H04L 69/40; G06F 11/0715; G06F 11/0757; G06F 11/30; G06F 11/202; G06F 11/1425; G06F 11/0703; G06F 11/0751; G06F 11/0754; G06F 11/3006; G06F 11/3017; G06F 11/3055; G06F 11/2023; G06F 11/2025; G06F 11/2028; G06F 11/203; G06F 11/2033; G06F 11/2035; G06F 11/2053
See application file for complete search history.

(56) References Cited

U.S. PATENT DOCUMENTS

| | | | | |
|---|---|---|---|---|
| 2007/0050497 A1* | 3/2007 | Haley | ................. | H04L 43/0817 709/224 |
| 2010/0232288 A1* | 9/2010 | Coatney | .............. | G06F 11/2033 370/221 |
| 2012/0197822 A1* | 8/2012 | Lee | ....................... | G06F 9/5061 706/10 |

\* cited by examiner

DETECT PROCESS HEALTH REMOTELY IN A REALTIME FASHION

PRIORITY CLAIMS; RELATED APPLICATIONS

This application is a non-provisional of Indian Provisional Application No. 4760/CHE/2014, filed Sep. 27, 2014, entitled "Detect Process Health Remotely in a Realtime Fashion", the entire contents of which is incorporated for all purposes as though fully stated herein.

FIELD OF THE INVENTION

The present invention relates generally to node management in systems that are distributed over one or more networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is typically useful to monitor the health of computer processes, such as processes that implement or are executed by applications, application servers, database servers, and/or other computer components. The monitoring may be used for a variety of purposes, such as generating reports or statistics for a system administrator, taking automatic administrative actions to attempt to revive failed processes, or reconfiguring a system to account for failed processes.

In a distributed environment there may be a large number processes centrally managed by a monitoring server. These processes may be spread across a vast number of hosts and over many types of computer networks. In such an environment, it may be a challenge to detect the health of these remote processes in a real-time or near real-time fashion.

One solution may be to have a monitoring server ping the processes at intervals. Another solution may be to have the processes themselves, or agents thereof, ping the monitoring server at intervals. However, for a variety of reasons, there is often an undesirable period of delay between the failure of a process and the monitoring server recognizing that a failure has occurred.

SUMMARY OF THE INVENTION

The appended claims may serve to summarize the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to an embodiment, a system of remote nodes may be divided into sets of partner nodes. One remote node becomes a partner of another remote node. As partners, the nodes agree to monitor each other's health and report anomalies, such as a failure of one of the nodes, to a monitoring server. The nodes do so using a persistent communication link, such as an open socket. Generally, failure of a node occurs when the persistent communication link terminates, which indicates that the node has gracefully shutdown, crashed, or otherwise become unresponsive.

In an embodiment, the partner for a given node is identified by the monitoring server based on its network configuration and/or on pre-defined configuration data. However, in other embodiments, some or all of the nodes may identify their own partners, and optionally report the identification of their partners to the monitoring node. In systems where certain nodes may not necessarily be capable of connecting to and/or monitoring certain other nodes, candidate partner nodes may be identified, and the candidate partner nodes may report to the monitoring server whether they can actually function as a partner for a given node.

Using the described techniques, among other aspects, the monitoring load of a system is distributed in part away from the monitoring server and to the nodes themselves. This may, in at least some embodiments, reduce the resources required of the monitoring server. At the same time, since nodes are now being monitored by partner nodes that are likely to be topologically closer than the monitoring server, and/or on account of the monitoring being performed via a persistent communication link, certain failures can be detected in real-time or near real-time. In turn, the responsiveness of the monitoring server with respect to monitoring the health of the system is improved.

System Overview

According to an embodiment, a system in which the described techniques may be practiced comprises a monitoring server, implemented by one or more computer devices. The monitoring server is connected via one or more network interfaces to one or more computer networks. The system also comprises a plurality of nodes. Each of the nodes is also connected by one or more network interfaces to the one or more computer networks. Each of the nodes is configured to establish a persistent communication link with at least one partner node in the plurality of nodes. Each of the nodes is further configured to send a report message to the monitoring server upon determining that the persistent communication link has terminated. The monitoring server is configured to identify failed nodes in the plurality of nodes based on report messages received from the plurality of nodes.

In an embodiment, instead of or in addition to sending report messages when the persistent communication link has terminated, a node may be configured to monitor events or metrics reported by its partner node over the persistent communication link. Whenever one or more metrics or events are reported that satisfy a reporting rule, such as a metric value above a threshold or a certain event message, the node may send a report message to the monitoring server.

In an embodiment, the monitoring server is further configured to assign different nodes in the plurality of nodes to different partner nodes in the plurality of nodes. Each of the nodes in the plurality of nodes is configured to listen for an assignment message from the monitoring server that indicates a partner node. Each of the nodes is further configured to establish the persistent communication link responsive to receiving the assignment message.

In an embodiment, the nodes are configured to send initial messages to the monitoring server, with network configuration information for the nodes. The monitoring server is configured to assign at least first partner nodes based on the network configuration information. In an embodiment, the monitoring server is further configured to assign a partner node to a given node based on a measure of closeness of the given node to one or more additional nodes, including the partner node, relative to a topology of the one or more networks. In an embodiment, the system further comprises a repository storing at least a list of predefined groups of partner nodes. The monitoring server may be configured to assign at least second partner nodes based on the predefined groups. Additionally, or instead, the repository stores one or more exclusion lists. The monitoring server may be configured to not assign any nodes in the exclusion list to be partner nodes. An exclusion list may be global to every node in the system, or relative to an individual node.

In an embodiment, the nodes are further configured to periodically send ping messages to the monitoring server. The monitoring server is further configured to identify additional failed nodes based on failing to receive ping messages from the additional failed nodes.

In an embodiment, the persistent communication link established by each node is an open socket, wherein the nodes are configured to periodically write a chunk of data to their respective open sockets. In an embodiment, each node of the plurality of nodes is configured to, when performing an expected shut down operation, send a termination message over the persistent communication link indicating that the node is shutting down. The report message from a given node indicates whether the termination message was sent.

In an embodiment, the monitoring server is further configured to identify multiple candidate partner nodes for a given node. The monitoring server is further configured to send a request message to at least a first node of the multiple candidate nodes, requesting whether the first node can connect to the given node. Each node of the candidate partner nodes is configured to determine whether the node can connect to the given node and then send a response message to the monitoring server indicating whether the node can connect to the given node. The monitoring server is further configured to identify a partner node based on one or more response messages from one or more candidate nodes.

In an embodiment, the monitoring server is further configured to assign a given node a new partner node responsive to determining that a previous partner node of the given node has failed.

In an embodiment, each node in at least a group of nodes in the plurality of nodes is configured to select, on its own, a partner node from the group of nodes. For instance, a node may obtain a list of candidate partner nodes from the monitoring server, or have access to a predefined list or directory of candidate partner nodes, or be capable of identifying a group of candidate partner nodes using a peer-to-peer discovery protocol. The partner node may then be selected using any suitable technique described herein. When the partner node is selected, the node may optionally be configured to send an announcement message identifying the selected partner node to the monitoring server.

Example System Architecture

Figure 1:
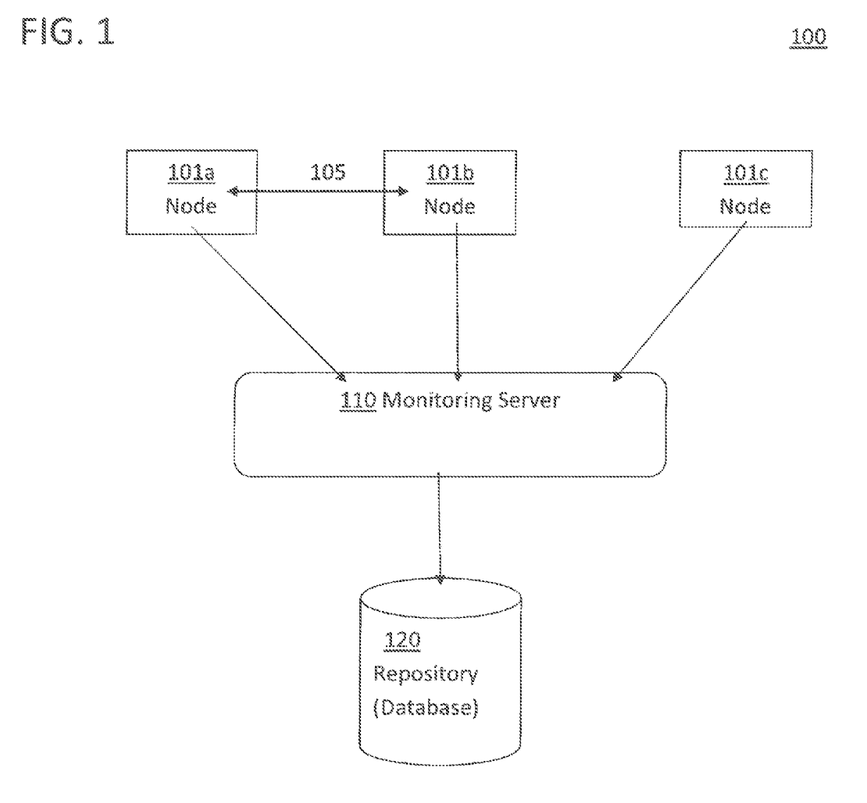
FIG. 1 illustrates an example networked computer system in which the described techniques may be practiced.

FIG. 1 illustrates an example networked computer system 100 in which the described techniques may be practiced, according to an embodiment. System 100 comprises one or more computing devices. These one or more computing devices comprise any combination of hardware and software configured to implement the various logical components described herein, including components 101-120. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

System 100 comprises a plurality of nodes 101. Although only nodes 101a-101c are depicted, system 100 may in fact have any number of nodes, including thousands or even millions of nodes. Nodes 101 may take a variety of forms, depending on the embodiment. For instance, in various embodiments, each node 101 may be a process, a computing device at which one or more processes are executing, an agent process at a computing device that monitors or manages a number of different processes on the computing device, or a cluster of computing devices.

System 100 further includes a monitoring server 110. Monitoring server 110 is implemented by a set of one or more computing devices. Monitoring server 110 is coupled to nodes 101 via one or more networks, such as intranets, internets, virtual private networks, and so forth.

While nodes 101 are all coupled to monitoring server 110, the configuration of the one or more networks may, in some embodiments, be such that certain nodes 101 may not be able to communicate with other nodes 101. For instance, firewalls, gateways, routers, and/or other components of the one or more networks may prevent direct communication between node 101c and nodes 101a-101b. As a consequence, node 101c has no partner, and its health is monitored by monitoring server 110 using conventional techniques.

However, at least some of nodes 101 may be capable of direct communication. For instance, nodes 101a and 101b may be configured as partner nodes. This may be for a number of reasons. For instance, nodes 101a and 101b may be in relatively close proximity on a same subnet of the one or more networks. When a node 101 is a partner node, the node 101 establishes a persistent communication link with its partner, such as communication link 105. Using the persistent communication link, a node may report on the health of its partner node to monitoring server 110 in real-time or near real-time, or in any event faster than monitoring server 110 would typically be capable of recognizing failures based on a periodic ping mechanism.

Communication link 105 may be, for instance, an open socket between nodes 101a and 101b. Or, communication link 105 may be any other communication link suitable for a node 101a or node 101b to recognize a failure at the other of node 101a or 101b in real-time or near real-time. For instance, communication link 105 may be a continuous exchange of messages between node 101*a* and node 101*b* in accordance with an established protocol that includes some timeout element.

System 100 may include any number of nodes 101 designated as partner nodes. Moreover, in at least some embodiments, the size of a partnership may include any number of nodes, though for simplicity and illustrative purposes the techniques described herein are typically described with respect to pairs of partners.

Monitoring server 110 is configured to receive various messages from nodes 101. These messages may include periodic ping messages, based on which the monitoring server 110 may determine failures using conventional means. These messages may also include report messages indicating when a partner of a node has failed. For instance, responsive to detecting termination of link 105, node 101*a* is configured to send a report message to monitoring server 110 describing the failure. These messages may further include, in some embodiments, initial notification messages announcing a node 101 to monitoring server 110, along with the node's network configuration information and/or other information.

Monitoring server 110 may further be configured to send various messages to nodes 101. These messages may include, depending on the embodiment, messages indicating partnership assignments, requests to determine whether a given node 101 can function as a partner for another node 101, instructions configured to cause a node 101 to be revived, and so forth.

In an embodiment, monitoring server 110 is further configured to send notification messages, such as emails or text messages, to client devices. Such notification messages may, for instance, report a failure of a node 101 to an administrator. Monitoring server 110 may also or instead provide a graphical user interface or web-based interface by which information about the health of nodes 101, including various events, metrics, and/or any failures, may be displayed to a user.

System 100 further comprises a repository 120, to which the monitoring server 110 is connected. Repository 120 may store a variety of data concerning network 100, such as network configurations, current partnership data, predefined partner lists, and so forth. Repository 120 may further store a variety of additional data, some or all of which may be utilized by nodes 101.

In one example embodiment, each node 101 comprises an agent software application executing on a single host. The agent monitors and collects data for all the software deployed on a host and uploads it to the monitoring server 110. For instance, the agent may send the data via XML over HTTP/HTTPS, or using any other suitable formats or protocols. The agent also has a HTTP server running on it, through which the agent communicates with the monitoring server 110. The monitoring server 110 is a centralized mid-tier server backed by an Oracle Database Repository. More specifically, the monitoring server 110 is a web-based application deployed on a J2EE container. All of the agents upload their data to this mid-tier server, which parses the XML data and uploads it inside the Oracle Database Repository. However, the components of system 100 may take a variety of other forms in other embodiments.

System 100 is but an example of a system that is suitable for performing the techniques described herein. Other systems may comprise additional or fewer components in varying arrangements. The division of functions between components may also differ, depending on the embodiment.

Functional Overview

According to an embodiment, a monitoring server such as monitoring server 110 identifies nodes such as nodes 101 within a system. The nodes are connected to the monitoring server via one or more networks. For each node of at least a plurality of the nodes, the monitoring server assigns at least one other node of the nodes to be a partner node for the node. The monitoring server sends a message to at least one of the node or the other node indicating that the node and the other node are assigned as partner nodes. Responsive to the message, the node and the assigned partner node establish a communication link between each other. The node and its partner node are configured to report to the monitoring server when the communication link has terminated. However, since termination implies that one of the nodes failed, typically only one of the nodes (the node that is still healthy) will report the termination of the communication link.

The monitoring server receives a report message from a particular node of the plurality of nodes. The report message indicates that a particular communication link between the particular node and a particular partner node selected for the particular node has terminated. Responsive to the report message, the monitoring server determines that the particular partner node has failed.

In an embodiment, responsive to determining that the particular partner node has failed, the monitoring server performs one or more of: reconfiguring the system to reflect the particular partner node failing, generating a report indicating that the particular partner node has failed, or sending an instruction to a system component configured to attempt to revive the particular partner node. In an embodiment, responsive to determining that the particular partner node has failed, the monitoring node selects a new one of the nodes to be a partner node for the particular node. However, the techniques described herein are not limited to any particular action that is performed responsive to the monitoring server detecting a failure.

In an embodiment, for at least a first node of the plurality of the nodes, the monitoring server selects at least a second node of the nodes and a third node of the nodes as candidate partner nodes for the first node. The monitoring server sends to the second node a first message identifying the first node. The monitoring server receives from the second node, a response message indicating that the second node cannot establish a communication link with the first node. Based on the response message, the monitoring server sends to the third node a second message identifying the first node. This message may be separate from or the same as a message indicating that the third node and the second node are partner nodes. The monitoring server assigns the third node to be a partner node for the first node responsive to receiving an indication that the third node can establish a communication link with the first node. In an embodiment, the monitoring server assigns multiple nodes of the nodes as partner nodes for at least a first node of the nodes.

In an embodiment, the monitoring server assigns the particular partner node to the particular node based at least on measures of closeness of the partner node to one or more additional nodes, including the particular partner node. The measure of closeness is relative to a topology of the one or more networks. In an embodiment the measures of closeness are functions of internet addresses and subnet masks of the particular node and the one or more additional nodes. In an embodiment, the particular partner node is assigned to the particular node based on the particular partner node and the partner node both belonging to a same subnet of the one or more networks, and further based on the particular partner node and the partner node both not currently having a functional assigned partner node. In an embodiment, the particular partner node is assigned to the particular node based on communication response times between the particular node and one or more additional nodes, including the particular partner node.

In an embodiment, the monitoring server receives initial messages from the nodes identifying the nodes to the monitoring server. The monitoring server assigns at least some of the partner nodes responsive to the initial messages. In an embodiment, the initial messages include network configurations of sending nodes.

In an embodiment, the monitoring server receives ping messages from the nodes at predefined intervals. The monitoring server detects a failure of a first node that is not assigned a partner node based upon the monitoring server not receiving a ping message from the first node in a certain period of time.

In an embodiment, the particular communication link is an open socket between the particular node and/or the particular partner node. In an embodiment, the particular communication link is an exchange of messages between the particular node and/or the particular partner node in accordance with an established protocol. The particular communication link is said to terminate when the particular node and/or the particular partner node cease to exchange messages in accordance with the established protocol. The protocol at least includes a rule establishing a timeout period.

In an embodiment, the report message includes information concerning a manner in which the particular partner node failed. For instance, in an embodiment, the information indicates whether, prior to termination of the particular communication link, the particular partner node sent a notice message over the particular communication link indicating that the particular partner node was shutting down.

In an embodiment, the monitoring server assigns at least some of the nodes to partner nodes based on configuration data specifying pre-defined partners.

In an embodiment, a method of identifying partners comprises identifying one or more partner nodes for a particular node based on identifying nodes within a same subnet as the one or more partner nodes, and further based on one or more of: comparing response times between the particular node and the nodes within the same subnet to identify one or more nearest neighbor nodes of the particular node; for each given node of the nodes within the same subnet, comparing, results of a function of a subnet mask and an internet address for the given node to results of a function of a subnet mask and an internet address for the particular node; and/or comparing physical locations at which computer devices that implement the particular node and the nodes within the same subnet are located. The method may be applied to select partners for a node in any context described herein, and/or for any other suitable purpose.

Example Process Flow

Figure 2:
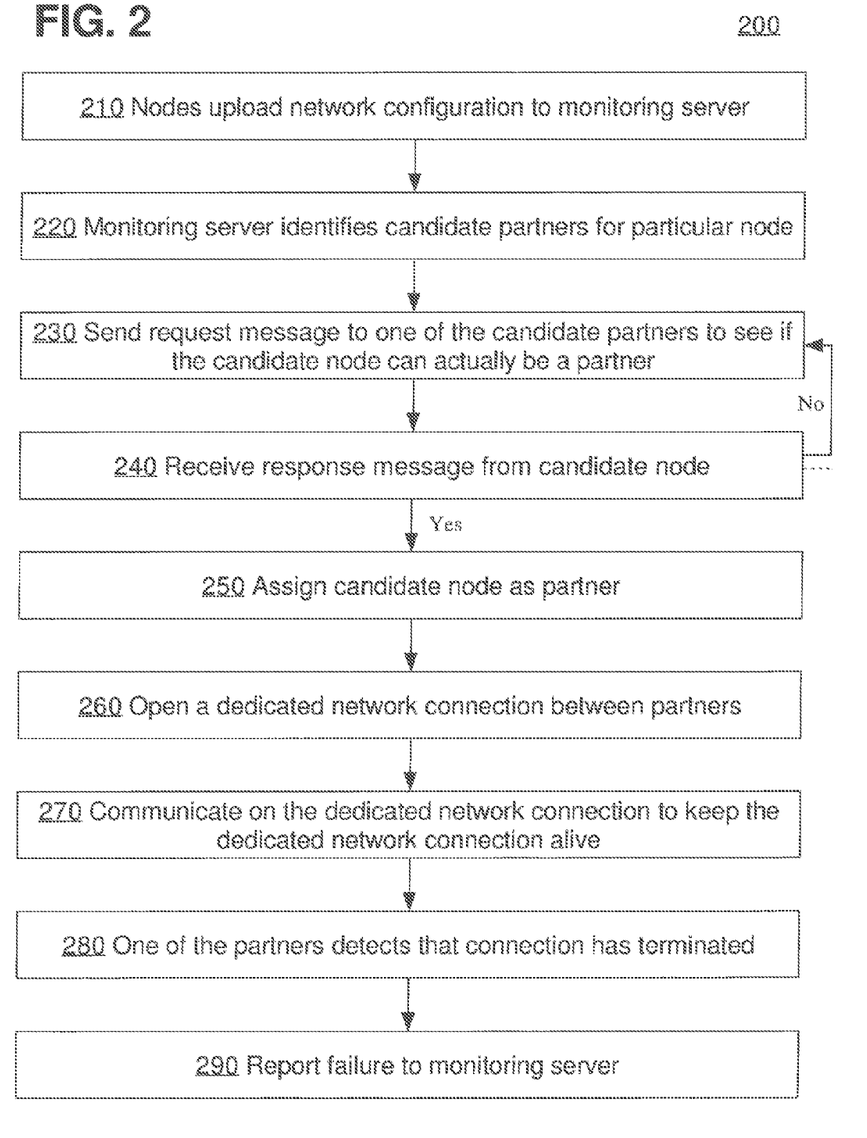
FIG. 2 illustrates an example flow for identifying node failures in a distributed system.

FIG. 2 illustrates an example flow 200 for identifying node failures in a distributed system, according to an embodiment. The various elements of flow 200 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 210 comprises each node in a system of nodes, such as system 100, initially uploading the network configuration of the computing device(s) on which it is running to a monitoring server.

Block 220 comprises the monitoring server identifying candidate partners for a particular node. In an embodiment, the candidate partners are generally selected such that they are relatively close to the particular node, as may be indicated by one or more of network configuration information, response times, or other networks statistics. However, this need not necessarily always be the case. For instance, some partners and/or candidates may be selected based on pre-defined partner lists, which specify nodes that may be and/or may not be partners. In an embodiment, the monitoring server is configured to avoid selecting candidate nodes that are already in partnerships, or in more than a threshold number of partnerships. However, in other embodiments, there is no limit to the number of partnerships a candidate node may be in.

In an embodiment, the monitoring server may have a background process running which compares network identifiers for various nodes to detect another node running closest to the particular node. For instance, the following formula might be used to compute the network identifier, where inet_address in the Internet Protocol address of the node and the mask is the subnet mask of the node.

Network id=bitand of first octet of inet_address with first octet of mask+"."+bitand of second octet of inet_address with second octet of mask+"."+bitand of third octet of inet_address with third octet of mask+"."+bitand of fourth octet of inet_address with fourth octet of mask.

For instance, assume that a system comprises nodes A and B running on network XYZ, and nodes C and D running on network RST. A list of nodes running closest to each other may be computed in the below manner List of probable partners (B, C,D)
List of probable partners (A, C,D)
List of probable partners (D, A,B)
List of probable partners (C, A,B)

Once a list of candidate partner nodes closest to a particular node has been identified, it is time to find the best partner for the particular node.

Block 230 comprises sending a request message to one of the candidate nodes (e.g. the "closest" remaining candidate in the list) asking the candidate node to confirm whether the candidate node can actually be a partner with the particular node. In an embodiment, a candidate node may actually be a partner so long as the candidate node can communicate with the partner node over one or more networks. In other embodiments, additional criteria may need to be satisfied for a candidate node to become a partner. For instance, in embodiments where the monitoring server is not configured to avoid selecting candidate nodes that are already in partnerships, a possible requirement may be that a candidate node not already be in a partnership, or in more than a threshold number of partnerships. As further examples, a candidate node may need to be able to communicate with the particular node using a common protocol, or have a similar classification as the particular node.

Block 240 comprises receiving a response message from the candidate node. If the response is negative, block 230 is repeated. Otherwise flow proceeds to block 250, at which the candidate node is assigned to be the partner node of block 250. Block 250 may further comprise storing data in a repository indicating the assignment, so that the nodes are not selected as partners for other nodes.

For instance, continuing with the above example system, block 230 may involve asking node B to check if it can reach the node A. If it can, then in accordance with block 250, node B is identified as the partner for node A. If B is not able to reach A, then block 230 is performed with respect to node C and, if necessary, each of the other candidate nodes. The candidate node which is able to reach the particular node becomes the partner node for node A.

Once a partner has been identified for a particular node, then at block 260 the partner node or the particular node opens up a dedicated network connection with the other of the partner node or the particular node. For instance, the monitoring server may send an assignment message to one or both of the partner node or the particular node indicating that the two nodes are partners. The node receiving the assignment message may then attempt to initiate the connection. Or, in an embodiment, the identified partner node unilaterally attempts to initiate the connection immediately upon affirming that it can actually be a partner in block 240.

Block 270 comprises communicating on the dedicated network connection to keep the dedicated network connection alive. For instance, one or both of the nodes may keep writing small chunks of data on the network connection, which the other of the node(s) keeps reading, so that the network connection does not timeout. In an embodiment, the communication may be any arbitrary communication, such as repeated characters or random text. In an embodiment, the communication may be metrics or event messages reflecting the operating status of the sending node.

Block 280 comprises detecting, at one of the particular node or the partner node, that the dedicated network connection has terminated. This may occur in a number of manners. For instance, if a node whose failure is being monitored shutdowns normally, then the node may write bytes in a specific sequence so that the node monitoring the failure (i.e. the partner of the monitored node) is able to detect that the monitored node is going down normally. On the other hand, if the monitored node crashes, then a pipe between the monitored node and the monitoring node also ends abruptly, and the monitoring node immediately learns that there is something wrong with the monitored node. In either event, the monitoring node is able to monitor the failure a real-time or near real-time.

In an embodiment, in the event of an apparent crash, a node that is monitoring the crash optionally may attempt to contact with its partner one or more times to rule out the possibility that a network issue caused termination of the connection. If contact is reestablished, flow returns to block 270, or the nodes may request new partners on account of the network issue.

Block 290 comprises sending a report message from the node that monitored the failure of its partner to the monitoring server.

In an embodiment, if the partner node for the particular node goes down, the monitoring server may dynamically detect a new partner for that particular node, by returning to block 220.

In an embodiment, if there are no partners available for a node, then the system reverts to monitoring the health of a node using pings between nodes and the monitoring server In this fallback mechanism, the monitoring server would only learn of a node going down by virtue of the node not being pinged. In an embodiment, nodes that have partners may additionally utilize the fallback pinging mechanism for redundancy in case both partners were to fail at the same time.

Flow 200 is one example of monitoring the health of a system. Other flows may comprise fewer or additional elements, in varying arrangements. For instance, instead of identifying multiple candidate partner nodes at block 220, a single partner node may be identified using any suitable technique, and blocks 230-250 may therefore not be necessary. As another example, blocks 230-250 may be performed for all candidate nodes concurrently, with the "closest" candidate node that responds affirmatively being assigned as partner.

Example Embodiments

Example embodiments are represented in the following numbered clauses:

1. A system comprising: a monitoring server, implemented by one or more computer devices, the monitoring server connected via one or more network interfaces to one or more computer networks; at least a plurality of nodes, each node of the plurality of the nodes implemented by a different computing device, each of the nodes also connected by one or more network interfaces to the one or more computer networks; wherein each node of the plurality of the nodes is configured to establish a persistent communication link with at least one partner node in the plurality of nodes, and send a report message to the monitoring server when the persistent communication link has terminated and/or whenever one or more metrics reported, by the at least one partner node, on the persistent communication link satisfy an event reporting rule; wherein the monitoring server is configured to identify failed nodes, or nodes that are experiencing events, in the plurality of nodes based on report messages received from the plurality of nodes.

2. The system of Clause 1, wherein the monitoring server is further configured to assign different nodes in the plurality of nodes to different partner nodes in the plurality of nodes; wherein each node of the plurality of the nodes is further configured to listen for an assignment message from the monitoring server that identifies the partner node for the node, and to establish the persistent communication link with the partner node responsive to receiving the assignment message.

3. The system of Clause 2, wherein each node of the plurality of the nodes is configured to send an initial message to the monitoring server with network configuration information for the node; wherein the monitoring server is further configured to assign at least first partner nodes based on the network configuration information for each node of the plurality of the nodes.

4. The system of any of Clauses 2-3, further comprising: a repository storing at least a list of predefined groups of partner nodes; wherein the monitoring server is further configured to assign at least second partner nodes based on the predefined groups.

5. The system of any of Clauses 2-4, wherein the monitoring server is further configured to assign a partner node to a given node based on a measure of closeness of the given node to one or more additional nodes, including the partner node, relative to a topology of the one or more networks.

6. The system of any of Clauses 1-5, wherein each node of the plurality of the nodes is further configured to periodically send ping messages to the monitoring server; wherein the monitoring server is further configured to identify additional failed nodes based on failing to receive one or more expected ping messages from the additional failed nodes.

7. The system of any of Clauses 1-6, wherein the persistent communication link established by each node of the plurality of nodes is an open socket, wherein the node is configured to periodically write a chunk of data to the open socket to keep the persistent communication link from terminating.

8. The system of any of Clauses 1-7, wherein each node of the plurality of nodes is configured to, when performing an expected shut down, send a termination message over the persistent communication link indicating that the node is shutting down; wherein a report message from a given node indicates whether the termination message was received the partner node of the given node.

9. The system of any of Clauses 1-8, wherein, for a given node of the plurality of nodes: the monitoring server is further configured to select, from the plurality of nodes, multiple candidate partner nodes for a given node, and send a request message to at least one candidate node of the candidate partner nodes inquiring whether the candidate node can connect to the given node; the candidate node is configured to determine, responsive to the request message, whether the candidate node can connect to the given node, and to send a response message to the monitoring server indicating whether the candidate node can connect to the given node; and the monitoring server is further configured to identify a partner node for the given node based on one or more response messages from one or more of the candidate partner nodes.

10. The system of any of Clauses 1-9, wherein the monitoring server is further configured to assign a given node of the plurality of nodes a new partner node from the plurality of nodes responsive to determining that a previous partner node of the given node has failed.

10. The system of any of Clauses 1-10, wherein each node in at least a group of nodes in the plurality of nodes is configured to select a partner node from the group of nodes and send an announcement message identifying the selected partner node to the monitoring server.

12. A method comprising: identifying, at a monitoring server, nodes within a system, the nodes connected to the monitoring server via one or more networks; for each node of at least a plurality of the nodes, the monitoring server: assigning at least one other node of the nodes to be a partner node for the node; sending a message to at least one of the node or the other node indicating that the node and the other node are partner nodes, the node and the other node configured to, responsive to the message, establish a communication link between the node and the other node, and to report to the monitoring server upon determining that the communication link has terminated; receiving, at the monitoring server, a report message from a particular node of the plurality of nodes, the report message indicating that a particular communication link between the particular node and a particular partner node selected for the particular node has terminated; responsive to the report message, determining that the particular partner node has failed.

13. The method of Clause 12, further comprising, responsive to determining that the particular partner node has failed, performing one or more of: reconfiguring the system to reflect the particular partner node failing, generating a report indicating that the particular partner node has failed, or sending an instruction to a system component configured to attempt to revive the particular partner node.

14. The method of any of Clause 12 or Clause 13, further comprising, responsive to determining that the particular partner node has failed, selecting a new one of the nodes to be a partner node for the particular node.

15. The method of any of Clauses 12-14, wherein each of the nodes is a different server computing device configured to execute one or more server-side computing processes, the one or more server-side processes including an agent configured to: listen for messages from the monitoring server, establish communication links with partner nodes, and report termination of the communication links to the monitoring server.

16. The method of any of Clauses 12-15, further comprising: for at least a first node of the plurality of the nodes, the monitoring server selecting at least a second node of the nodes and a third node of the nodes as candidate partner nodes for the first node; sending to the second node a first message identifying the first node; receiving, from the second node, a response message indicating that the second node cannot function as a partner node for the first node; based on the response message, sending to the third node a second message identifying the first node; assigning the third node to be a partner node for the first node responsive to receiving an indication that the third node can function as a partner node for the first node.

17. The method of any of Clauses 12-16, further comprising the monitoring server assigning multiple nodes of the nodes as partner nodes for at least a first node of the nodes.

18. The method of any of Clauses 12-17, further comprising assigning the particular partner node to the particular node based at least on measures of closeness of the partner node to one or more additional nodes, including the particular partner node, relative to a topology of the one or more networks.

19. The method of Clause 18, wherein the measures of closeness are functions of internet addresses and subnet masks of the particular node and the one or more additional nodes.

20. The method of any of Clauses 12-19, further comprising assigning the particular partner node to the particular node based on the particular partner node and the partner node both belonging to a same subnet of the one or more networks, and further based on the particular partner node and the particular node both not currently having a functional assigned partner node.

21. The method of any of Clauses 12-20, further comprising assigning the particular partner node to the particular node based on communication response times between the particular node and one or more additional nodes, including the particular partner node.

22. The method of any of Clauses 12-21, further comprising: the monitoring server receiving initial messages from the nodes identifying the nodes to the monitoring server; the monitoring server assigning at least some of the partner nodes responsive to the initial messages.

23. The method of Clause 22, wherein the initial messages include network configurations of sending nodes.

24. The method of any of Clauses 12-23, further comprising: receiving ping messages from the nodes at predefined intervals; detecting a failure of a first node that is not assigned a partner node based upon the monitoring server not receiving a ping message from the first node in a certain period of time.

25. The method of any of Clauses 12-24, wherein the particular communication link is an open socket between the particular node and/or the particular partner node.

26. The method of any of Clauses 12-25, wherein the particular communication link is an exchange of messages between the particular node and/or the particular partner node in accordance with an established protocol, wherein the particular communication link is said to terminate when the particular node and/or the particular partner node cease to exchange messages in accordance with the established protocol, the protocol at least including a rule establishing a timeout period.

27. The method of any of Clauses 12-26, wherein the report message includes information concerning a manner in which the particular partner node failed.

28. The method Clause 27, wherein the information indicates whether, prior to termination of the particular communication link, the particular partner node sent a notice message over the particular communication link indicating that the particular partner node was shutting down.

29. The method of any of Clauses 12-28, wherein the monitoring server assigns at least some of the nodes to partner nodes based on configuration data specifying pre-defined partners.

30. A method comprising: identifying one or more partner nodes for a particular node based on identifying nodes within a same subnet as the one or more partner nodes, and further based on one or more of: comparing response times between the particular node and the nodes within the same subnet to identify one or more nearest neighbor nodes of the particular node; for each given node of the nodes within the same subnet, comparing results of a function of a subnet mask and an internet address for the given node to results of a function of a subnet mask and an internet address for the particular node; comparing physical locations at which computer devices that implement the particular node and the nodes within the same subnet are located; and/or for each given node of the nodes within the same subnet, determining whether the given node is already a partner node for more than a threshold number of other nodes.

31. The system of any of Clauses 1-11, wherein the method of Clause 30 is utilized to identify partner nodes.

32. The method of any of Clauses 12-29, wherein the method of Clause 30 is utilized to identify the particular partner node of the particular node.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
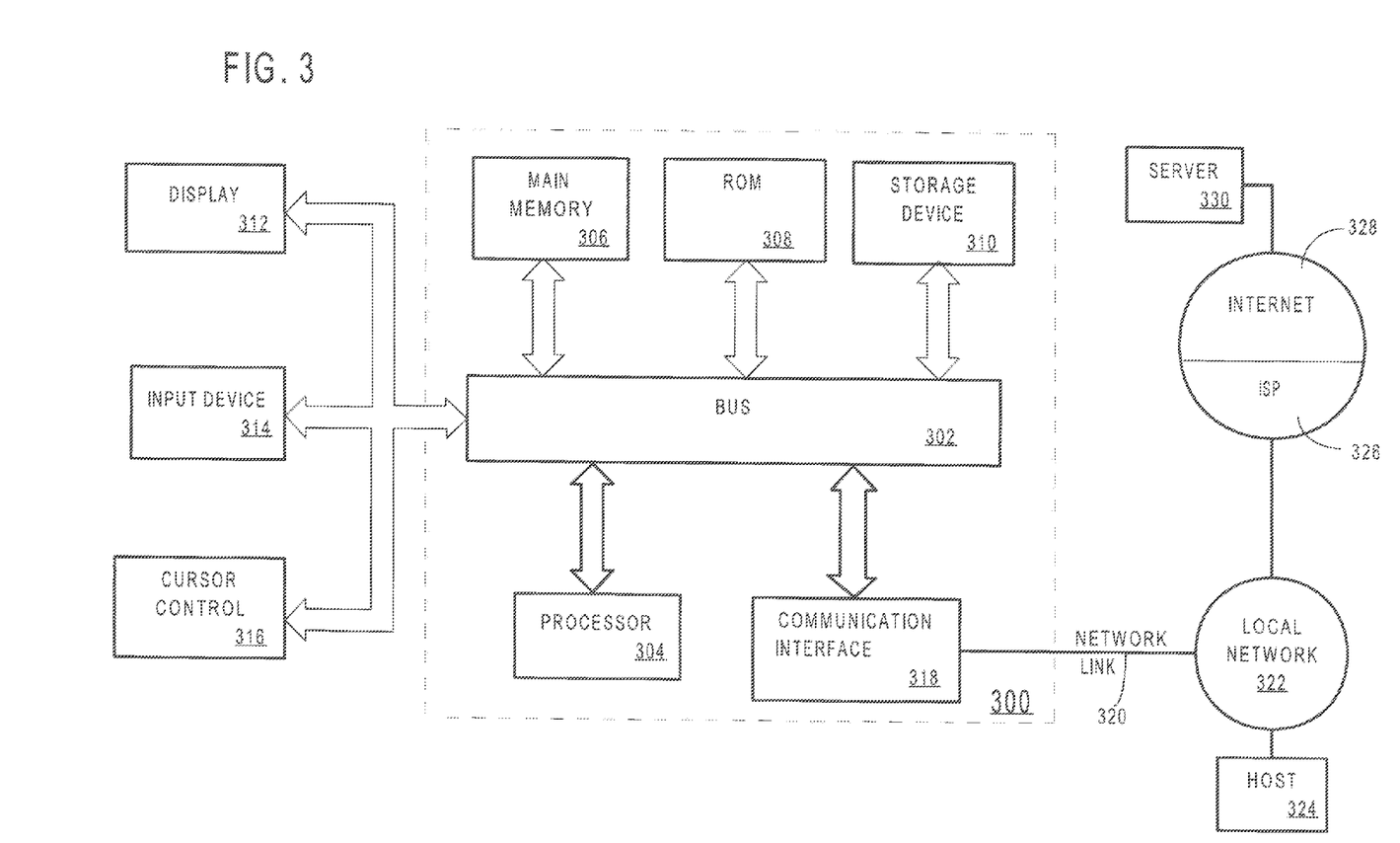
FIG. 3 is a block diagram that illustrates a computer system 300 upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In an embodiment, certain systems described herein may be a server computer system, comprising one or more server computer devices that collectively implement the various components of the system as a set of server-side processes. The server computer system may include web server, application server, database server, and/or other conventional server components that the depicted components utilize to provide the described functionality. In an embodiment, certain server components may be implemented in full or in part using "cloud"-based systems that are coupled to the system by one or more networks, such as the Internet. The cloud-based systems may expose interfaces by which they provide processing, storage, software, and/or other resources to the components of the system. In an embodiment, the cloud-based systems may be implemented by a third-party entity, on behalf of another entity for whom the system is deployed. In other embodiments, however, the components of the system may be implemented entirely by computer systems owned and operated by a single entity.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
 a monitoring server, hosted by one or more computer devices, the monitoring server connected via one or more network interfaces to one or more computer networks;
 a plurality of nodes, each node of the plurality of the nodes implemented by a different computing device, wherein each node of the plurality of nodes is connected by a respective one or more network interfaces to the one or more computer networks;
 wherein the monitoring server is configured, for each node of the plurality of nodes, to:

assign at least one other node of the plurality of nodes to be a partner node for the node; and
send a message to at least one of the node or the other node indicating that the node and the other node are partner nodes;
wherein each node of the plurality of nodes is configured to, responsive to the message, establish a persistent communication link with one or more partner nodes in the plurality of nodes, and send a report message to the monitoring server in response to detecting a report condition based on the persistent communication link;
wherein the monitoring server is configured to;
receive a particular report message from a particular node of the plurality of nodes, the particular report message indicating that a particular persistent communication link between the particular node and a particular partner node selected for the particular node has satisfied the report condition; and
responsive to the particular report message, determine that the particular partner node has failed.

2. The system of claim 1, wherein the monitoring server is further configured to assign a particular partner node to a given node based on a measure of closeness of the given node to one or more additional nodes, including the particular partner node, relative to a topology of the one or more networks.

3. The system of claim 1,
wherein each node of the plurality of nodes is further configured to periodically send ping messages to the monitoring server;
wherein the monitoring server is further configured to identify additional failed nodes based on failing to receive one or more expected ping messages from the additional failed nodes.

4. The system of claim 1,
wherein each node of the plurality of nodes is configured to, when performing an expected shut down, send a termination message over the persistent communication link indicating that the node is shutting down;
wherein a report message from a given node indicates whether the termination message was received by a partner node of the given node.

5. The system of claim 1,
wherein, for a given node of the plurality of nodes:
the monitoring server is further configured to select, from the plurality of nodes, multiple candidate partner nodes for the given node, and send a request message to at least one candidate node of the candidate partner nodes inquiring whether the candidate node can connect to the given node;
the candidate node is configured to determine, responsive to the request message, whether the candidate node can connect to the given node, and to send a response message to the monitoring server indicating whether the candidate node can connect to the given node; and
the monitoring server is further configured to identify a partner node for the given node based on one or more response messages from one or more of the candidate partner nodes.

6. The system of claim 1, wherein the monitoring server is further configured to, in response to identifying that a particular node has failed, perform one or more of: reconfiguring the system to reflect the particular node failing, generating a report indicating that the particular node has failed, or sending an instruction to a system component configured to attempt to revive the particular node.

7. The system of claim 1, wherein the report condition occurs when the persistent communication link has terminated or when one or more metrics determined based on communications over the persistent communication link satisfy an event reporting rule.

8. The system of claim 1, wherein the monitoring server is further configured to identify one or more partner nodes for a particular node based on identifying nodes within a same subnet as the one or more partner nodes, and further based on one or more of:
comparing response times between the particular node and nodes within the same subnet to identify one or more nearest neighbor nodes of the particular node,
for each given node of the nodes within the same subnet, comparing results of a function of a subnet mask and an internet address for the given node to results of a function of a subnet mask and an internet address for the particular node,
comparing physical locations at which computer devices that implement the particular node and the nodes within the same subnet are located, or
for each given node of the nodes within the same subnet, determining whether the given node is already a partner node for more than a threshold number of other nodes.

9. A method comprising:
identifying, at a monitoring server, a plurality of nodes connected to the monitoring server via one or more networks;
for each node of the plurality of nodes, the monitoring server:
assigning at least one other node of the plurality of nodes to be a partner node for the node;
sending a message to at least one of the node or the other node indicating that the node and the other node are partner nodes, wherein the node and the other node, responsive to the message, establish a communication link between the node and the other node and report to the monitoring server in response to detecting a report condition based on the communication link;
receiving, at the monitoring server, a report message from a particular node of the plurality of nodes, the report message indicating that a particular communication link between the particular node and a particular partner node selected for the particular node has satisfied the report condition;
responsive to the report message, determining that the particular partner node has failed;
wherein the method is performed by one or more computing devices.

10. The method of claim 9, further comprising:
for at least a first node of the plurality of the nodes, the monitoring server selecting at least a second node of the plurality of nodes and a third node of the plurality of nodes as candidate partner nodes for the first node;
sending to the second node a first message identifying the first node;
receiving, from the second node, a response message indicating that the second node cannot function as a partner node for the first node;
based on the response message, sending to the third node a second message identifying the first node;
assigning the third node to be a partner node for the first node responsive to receiving an indication that the third node can function as a partner node for the first node.

11. The method of claim 9, further comprising:

assigning the particular partner node to the particular node based at least on measures of closeness of the particular node to one or more additional nodes, including the particular partner node, relative to a topology of the one or more networks;

wherein the measures of closeness are functions of internet addresses and subnet masks of the particular node and the one or more additional nodes.

12. The method of claim 9, further comprising:

each node of the plurality of nodes periodically sending ping messages to the monitoring server;

the monitoring server identifying additional failed nodes based on failing to receive one or more expected ping messages from the additional failed nodes.

13. The method of claim 9, wherein each node of the plurality of nodes, when performing an expected shut down, sends a termination message over the communication link indicating that the node is shutting down;

wherein a report message from a given node indicates whether the termination message was received by a partner node of the given node.

14. The method of claim 9, further comprising, for a given node of the plurality of nodes: the monitoring server selecting, from the plurality of nodes, multiple candidate partner nodes for the given node, and sending a request message to at least one candidate node of the candidate partner nodes inquiring whether the candidate node can connect to the given node;

the candidate node determining, responsive to the request message, whether the candidate node can connect to the given node, and sending a response message to the monitoring server indicating whether the candidate node can connect to the given node; and the monitoring server identifying a partner node for the given node based on one or more response messages from one or more of the candidate partner nodes.

15. The method of claim 9, further comprising the monitoring server, in response to identifying that a particular node has failed, performing one or more of: reconfiguring a system to reflect the particular node failing, generating a report indicating that the particular node has failed, or sending an instruction to a system component configured to attempt to revive the particular node.

16. The method of claim 9, wherein the report condition is satisfied when the communication link has terminated or when one or more metrics determined based on communications over the communication link satisfy an event reporting rule.

17. The method of claim 9, further comprising:

identifying one or more partner nodes for a particular node based on identifying nodes within a same subnet as the one or more partner nodes, and further based on one or more of:

comparing response times between the particular node and nodes within the same subnet to identify one or more nearest neighbor nodes of the particular node, for each given node of the nodes within the same subnet, comparing results of a function of a subnet mask and an internet address for the given node to results of a function of a subnet mask and an internet address for the particular node, comparing physical locations at which computer devices that implement the particular node and the nodes within the same subnet are located, or for each given node of the nodes within the same subnet, determining whether the given node is already a partner node for more than a threshold number of other nodes.

18. One or more non-transitory computer-readable storage mediums storing one or more instructions, which when executed by one or more processors, cause the processors to perform steps comprising:

identifying, at a monitoring server, a plurality of nodes connected to the monitoring server via one or more networks;

for each node of the plurality of nodes, the monitoring server:

assigning at least one other node of the plurality of nodes to be a partner node for the node;

sending a message to at least one of the node or the other node indicating that the node and the other node are partner nodes, wherein the node and the other node, responsive to the message, establish a communication link between the node and the other node and report to the monitoring server in response to detecting a report condition based on the communication link;

receiving, at the monitoring server, a report message from a particular node of the plurality of nodes, the report message indicating that a particular communication link between the particular node and a particular partner node selected for the particular node has satisfied the report condition;

responsive to the report message, determining that the particular partner node has failed.

19. The one or more non-transitory computer-readable storage mediums of claim 18, wherein the steps further comprise:

for at least a first node of the plurality of the nodes, the monitoring server selecting at least a second node of the plurality of nodes and a third node of the plurality of nodes as candidate partner nodes for the first node;

sending to the second node a first message identifying the first node;

receiving, from the second node, a response message indicating that the second node cannot function as a partner node for the first node;

based on the response message, sending to the third node a second message identifying the first node;

assigning the third node to be a partner node for the first node responsive to receiving an indication that the third node can function as a partner node for the first node.

20. The one or more non-transitory computer-readable storage mediums of claim 18, wherein the steps further comprise:

assigning the particular partner node to the particular node based at least on measures of closeness of the particular node to one or more additional nodes, including the particular partner node, relative to a topology of the one or more networks;

wherein the measures of closeness are functions of internet addresses and subnet masks of the particular node and the one or more additional nodes.

21. The one or more non-transitory computer-readable storage mediums of claim 18, wherein the steps further comprise:

each node of the plurality of nodes periodically sending ping messages to the monitoring server;

the monitoring server identifying additional failed nodes based on failing to receive one or more expected ping messages from the additional failed nodes.

22. The one or more non-transitory computer-readable storage mediums of claim 18, wherein the steps further comprise:
- wherein each node of the plurality of nodes, when performing an expected shut down, sends a termination message over the communication link indicating that the node is shutting down;
- wherein a report message from a given node indicates whether the termination message was received by a partner node of the given node.

23. The one or more non-transitory computer-readable storage mediums of claim 18, wherein the steps further comprise, for a given node of the plurality of nodes:
- the monitoring server selecting, from the plurality of nodes, multiple candidate partner nodes for the given node, and sending a request message to at least one candidate node of the candidate partner nodes inquiring whether the candidate node can connect to the given node;
- the candidate node determining, responsive to the request message, whether the candidate node can connect to the given node, and sending a response message to the monitoring server indicating whether the candidate node can connect to the given node; and
- the monitoring server identifying a partner node for the given node based on one or more response messages from one or more of the candidate partner nodes.

24. The one or more non-transitory computer-readable storage mediums of claim 18, wherein the steps further comprise: the monitoring server, in response to identifying that a particular node has failed, performing one or more of: reconfiguring a system to reflect the particular node failing, generating a report indicating that the particular node has failed, or sending an instruction to a system component configured to attempt to revive the particular node.

25. The one or more non-transitory computer-readable storage mediums of claim 18, wherein the report condition is satisfied when the communication link has terminated or when one or more metrics determined based on communications over the communication link satisfy an event reporting rule.

26. The one or more non-transitory computer-readable storage mediums of claim 18, wherein the steps further comprise:
- identifying one or more partner nodes for a particular node based on identifying nodes within a same subnet as the one or more partner nodes, and further based on one or more of:
  - comparing response times between the particular node and nodes within the same subnet to identify one or more nearest neighbor nodes of the particular node,
  - for each given node of the nodes within the same subnet, comparing results of a function of a subnet mask and an internet address for the given node to results of a function of a subnet mask and an internet address for the particular node,
  - comparing physical locations at which computer devices that implement the particular node and the nodes within the same subnet are located, or
  - for each given node of the nodes within the same subnet, determining whether the given node is already a partner node for more than a threshold number of other nodes.

27. A method comprising:
assigning one or more partner nodes to a particular node based on identifying nodes within a same subnet as the one or more partner nodes, and further based on one or more of:
- comparing response times between the particular node and the nodes within the same subnet to identify one or more nearest neighbor nodes of the particular node,
- for each given node of the nodes within the same subnet, determining whether the given node is already a partner node for more than a threshold number of other nodes.

28. One or more non-transitory computer-readable storage mediums storing one or more sequences of instructions which, when executed by one or more processors, cause the one or more processors to perform the method of claim 27.

* * * * *